United States Patent [19]

Boccuzzi et al.

[11] Patent Number: 6,094,740
[45] Date of Patent: Jul. 25, 2000

[54] CHANNEL QUALITY ESTIMATOR BASED ON NON-REDUNDANT ERROR CORRECTION

[75] Inventors: Joseph Boccuzzi, Brooklyn, N.Y.; Paul Petrus, Blackburg, Va.

[73] Assignee: Lucent Technologies Inc, Murray Hill, N.J.

[21] Appl. No.: 08/846,633

[22] Filed: Apr. 30, 1997

[51] Int. Cl.$^7$ ...................................................... G06F 11/00
[52] U.S. Cl. ........................................... 714/793; 370/333
[58] Field of Search ...................................... 371/43.5, 5.1, 371/5.5; 714/793, 786, 746, 752; 370/333, 332

[56] References Cited

U.S. PATENT DOCUMENTS 4,128,828  12/1978  Samejima et al. ..................... 371/43.5

OTHER PUBLICATIONS

Freebersyser, James et al., Non–Redundant Error Correction of Uncoded M–DPSK Using a Modified Viterbi Algorithm and a Sliding Block Non–Coherent Multiple–Symbol Detector, IEEE, 1994.

Wong et al., Nonredundant Error Correction DQPSK for the Aeronautical–Satellite Channel, Jan. 1995, IEEE pp. 168 to 181.

Yang et al., An Improved II/4 QPSK with Nonredundant Error Correction for Satellite Mobile Broadcasting, Mar. 1991, IEEE, pp. 9 to 16.

Wong et al., Nonredundant Error Correction analysis and Evaluation of differentially detected II/4 shift DQPSK system in a Combined CCI and AWGN Environment, Feb. 1992, IEEE. pp. 35 to 48.

*Primary Examiner*—Albert De Cady
*Assistant Examiner*—Shelly A Chase

[57] ABSTRACT

In a communication network, a method for channel quality estimation, without the need for a reference (uncorrupted) signal, comprises the steps of: processing a received signal utilizing a non-redundant error correction scheme to observe at least one symbol; producing an error signal in response to the observation; and counting a quantity of the error signal during a predetermined time interval to provide a symbol error count. A device for channel quality estimation, without the need for a reference (uncorrupted) signal, is also described.

17 Claims, 6 Drawing Sheets

6,094,740

CHANNEL QUALITY ESTIMATOR BASED ON NON-REDUNDANT ERROR CORRECTION

FIELD OF THE INVENTION

This invention relates generally to communications, and more particularly to digital communication systems.

BACKGROUND OF THE INVENTION

Wireless access provides tetherless access to mobile users, this has been done principally to address the requirements of two specific and disjoint domains: voice telephony and indoor data LANs. Cellular telephone networks have extended the domain of telephone service over a wireless last hop, while mobile-IP LANs such as WaveLAN and RangeLAN do the same for indoor users of TCP/IP data networks. Advances with wireless technology and high-speed integrated service wired networking promises to provide mobile users with comprehensive multimedia information access in the near future.

Personal Communication Services (PCS) are a broad range of individualized telecommunication services which enable individuals or devices to communicate irrespective of where they are at anytime. Personal Communication Networks (PCN) are a new type of wireless telephone system communicating via low-power antennas. PCNs offer a digital wireless alternative to the traditional wired line.

As a cellular mobile radio moves from one cell to another, it is "handed" off to the next cell by a controller, which determines which cell is receiving the strongest signal. Because the cellular user remains closer to the base transceiver than in classical mobile communications, the cellular user's transceiver requires less power and is therefore less expensive. The great advantage of the cellular concept over non-cellular radio is that higher capacity is allowed with the same frequency allocation. This advantage comes at a cost, the necessity of a large number of cell sites and associated radio ports.

Cellular and PCS technologies that are based on the North American Digital Cellular (NADC) use a spectrally efficient modulation technique called the Π/4-DQPSK to satisfy the increasing demand for system capacity. The quality of the channel is related to the symbol error rate. Channel quality estimator based on eye-diagram is a popular technique, but this technique does not provide a number to determine the quality of the channel easily. In another technique, the known synchronization bits in the Time Division Multiple Access(TMDA) are used to estimate the number of errors. In this technique the Symbol Error Rate (SER) is calculated during the SYNC duration and not over the entire TDMA time slot.

Therefore, there is a need for a more reliable and rapid estimate of the channel quality.

SUMMARY OF THE INVENTION

In accordance with the present invention, there is provided in a communication network a method for channel quality estimation without the need for a reference (uncorrupted) signal. The method comprises the steps of: processing a received signal utilizing a non-redundant error correction scheme to observe at least one symbol; producing an error signal in response to the observation; and counting a quantity of the error signal during a predetermined time interval to provide a symbol error count. A device in accordance with the present invention is also described.

BRIEF DESCRIPTION OF THE DRAWINGS

A more complete understanding of the present invention may be obtained from consideration of the following description in conjunction with the drawings in which.

DETAILED DESCRIPTION OF VARIOUS ILLUSTRATIVE EMBODIMENTS

Although the present invention is particularly well suited for use with a wireless communication network it is equally well suited for use with wired networks such as in the cable modem environment. Although the present invention is particularly well suited for use with North American Digital Cellular system utilizing TDMA and shall be described with respect to this application, the methods and apparatus disclosed here can be applied to other wireless systems including PCS and indoor wireless systems as well as cordless applications.

Figure 1:
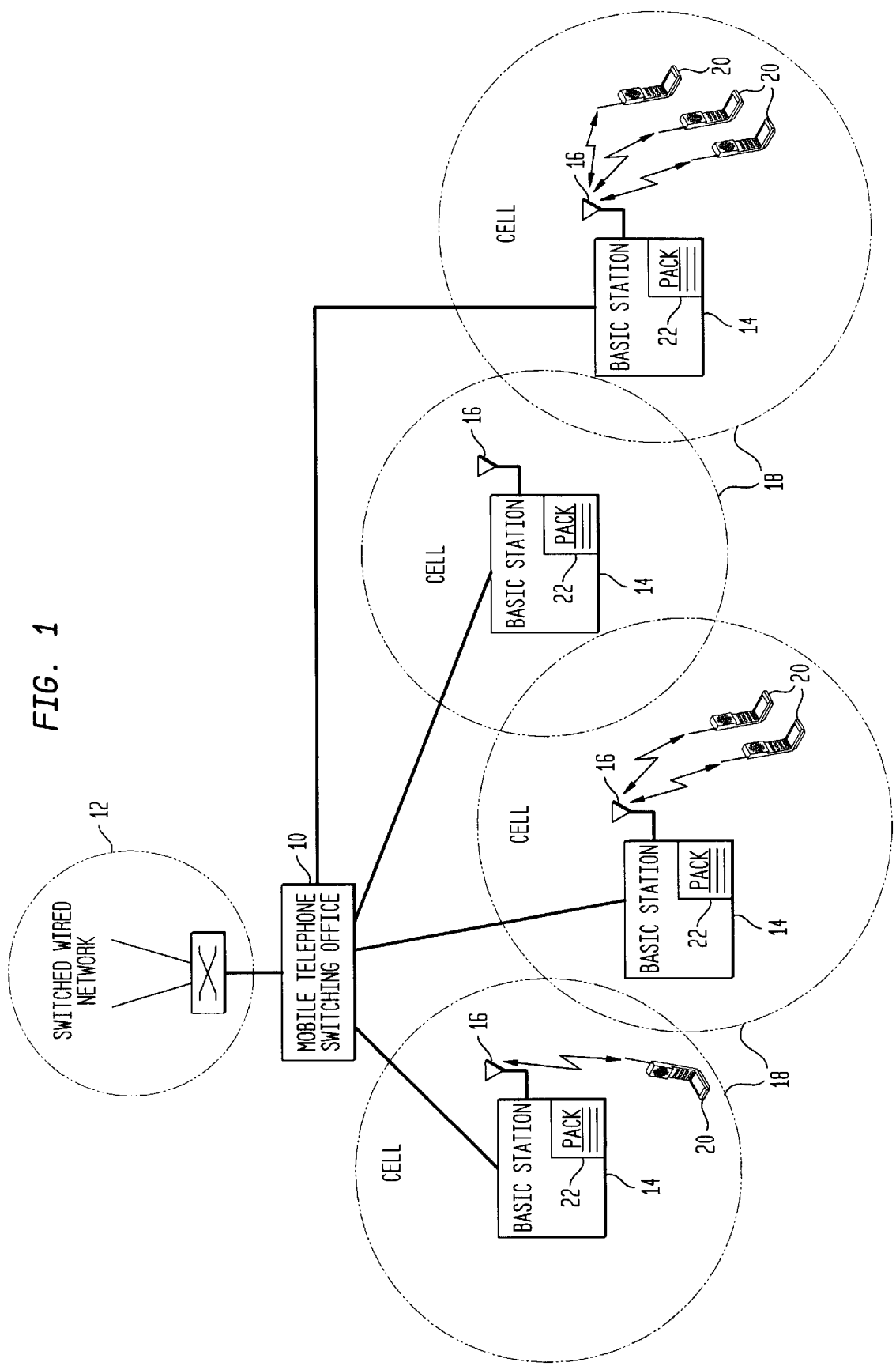
FIG. 1 is a block diagram of a wireless network employing the present invention.

Referring now to FIG. 1 there is shown a block diagram of a cellular wireless network. A Mobile Telephone Switching Office (MTSO) 10, also know as a Mobile Switching Center (MSC), provides for switching calls between the cellular network and the switched wired network 12. The MTSO 10 controls the entire operation of a cellular system, setting up and monitoring all cellular calls, and tracking the location of all cellular-equipped vehicles traveling in the system, arranging hand-offs, and providing billing information. The MTSO 10 is connected to a plurality of base stations 14. The cellular base station 14 is the fixed transceiver in the wireless network, which is coupled through a radio port to a cellular antenna 16. The typical cellular base station 14 consists of multiple radio transceiver ports 22. Radio transceiver ports 22 are assigned to a channel. The geographical area for which a cellular base station 14 acts as the gateway is called its cell 18, the various cellular base station 14 nodes are distributed at suitable locations. A cellular mobile unit 20 communicates with a cellular base station 14 within a traditional cellular network cell 18 through an assigned channel pair consisting of an uplink frequency and a downlink frequency.

In order to satisfy the increasing demand for capacity, the North American Digital Cellular (NADC) uses a spectrally efficient modulation technique called the Π/4-DQPSK. Non-redundant error correction (NEC) schemes for Differential Phase Shift Keying (DPSK) have been proposed to correct errors introduced by the channel. Depending upon the number of symbols observed, NECs are classified as 1-NEC, 2-NEC, 3-NEC and so on. The present invention utilizes the NEC schemes to estimate channel quality characteristics, in particular the Symbol Error Rate (SER) of the channel without the need for a reference (uncorrupted) signal.

Figure 2:
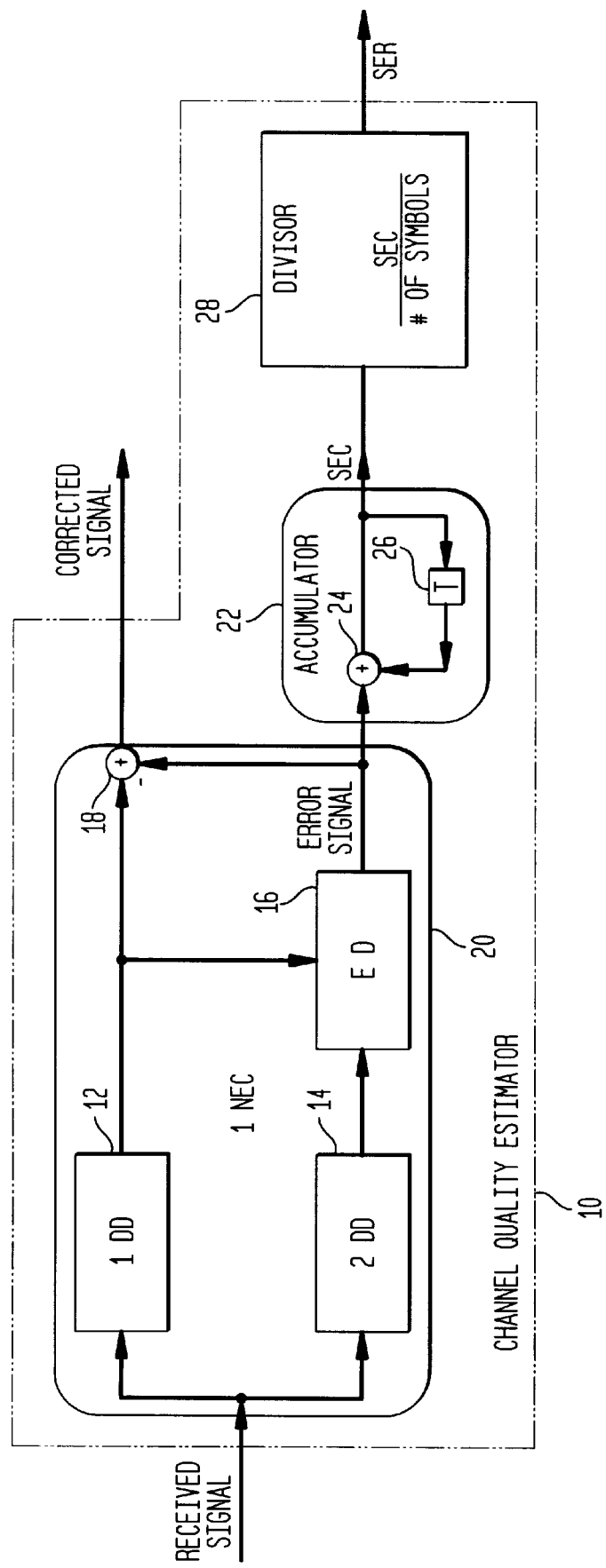
FIG. 2 is a block diagram of the 1-NEC Channel Quality Estimator.

Referring now to FIG. 2, there is shown a block diagram of the channel quality estimator (CQE) 10 utilizing the 1-NEC scheme to estimate the Symbol Error Rate (SER), which is the ratio of number of symbols in error to the number of symbols transmitted. A received signal is coupled to a one symbol differential detector 12 (1DD) and a two symbol differential detector 14 (2DD). The detected signal outputs from the one symbol differential detector 12 and the two symbol detector 14 are coupled into an error detector 16 (ED). The error detector 16 detects the presence of an error based on the syndromes developed from the inputs and outputs an error signal. Summer 18 subtracts the error signal from the output of the one symbol differential detector 12 producing a corrected signal. The one symbol differential detector 12, the two symbol differential detector 14, the error detector 16 and the summer 18 comprise the 1-NEC system 20. The error signal is coupled to an accumulator (AC) 22. The accumulator 22 counts the number of symbol errors providing a symbol error count (SEC). The accumulator utilizes a summer 24 and a delay element 26, wherein the output of the summer 24 is coupled to the delay element 26, and the output of the delay element 26 and the error signal are coupled to the summer 24. The output of the summer 24 provides the symbol error count. With divisor 28, an estimate of the symbol error rate 32 is obtained by dividing the symbol error count 28 by the number of symbols received. The number of symbols received per time slot is known a priori as defined in the NADC standard.

Figure 3:
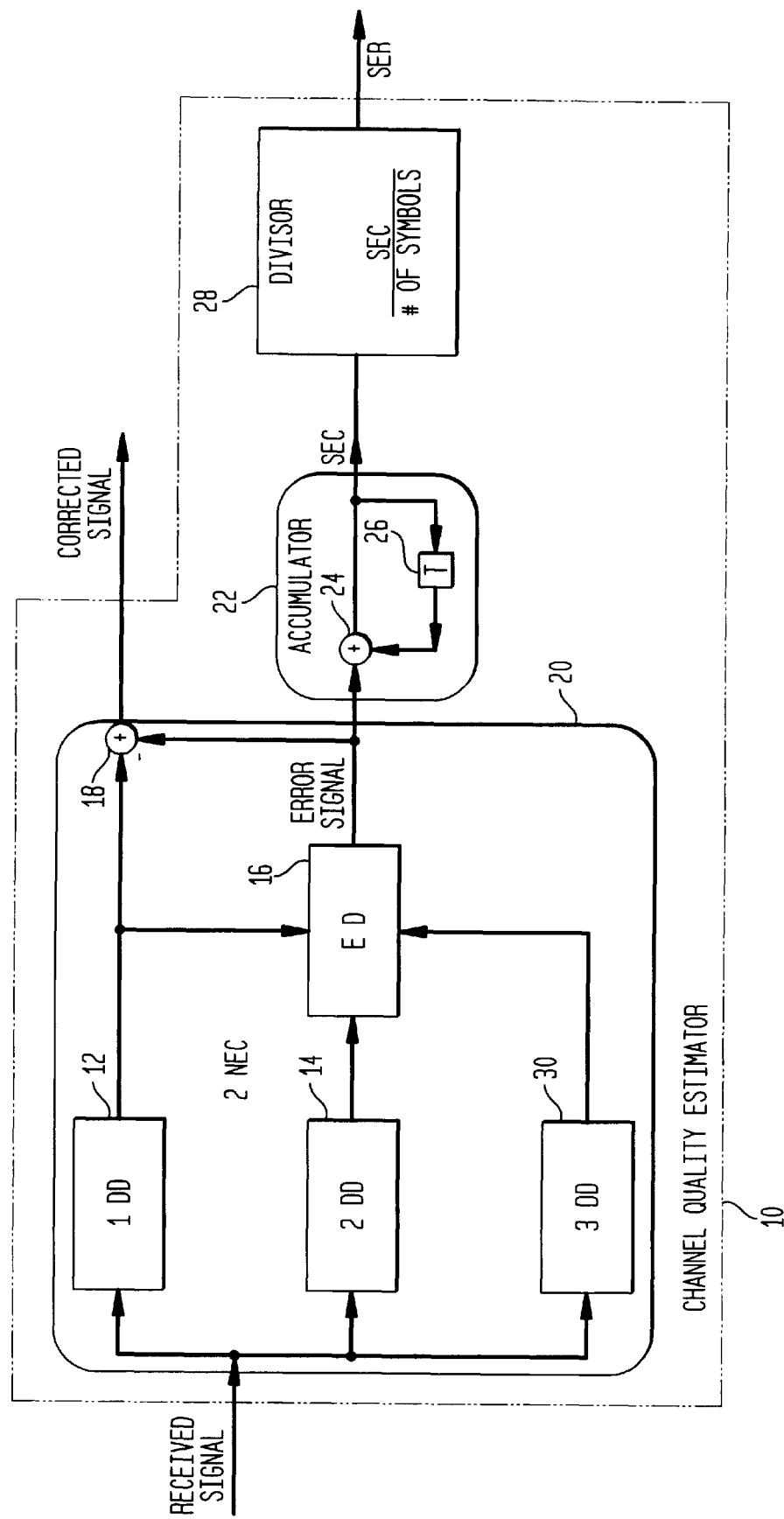
FIG. 3 is a block diagram of the 2-NEC Channel Quality Estimator.

Referring now to FIG. 3, there is shown a block diagram of the channel quality estimator (CQE) utilizing the 2-NEC scheme to estimate the Symbol Error Rate (SER). Elements performing the same functions to those in FIG. 2 are assigned the same numbers in FIG. 3. A received signal is coupled to a one symbol differential detector 12 (1DD), a two symbol differential detector 14 (2DD) and a three symbol differential detector 30 (3DD). The detected signal outputs from the one symbol differential detector 12, the two symbol detector 14 and the three symbol differential detector 30 are coupled into an error detector 16 (ED). The error detector 16 detects the presence of an error based on the syndromes developed from the inputs and outputs an error signal. Summer 18 subtracts the error signal from the output of the one symbol differential detector 12 producing a corrected signal. The one symbol differential detector 12, the two symbol differential detector 14, the three symbol differential detector 30, the error detector 16 and the summer 18 comprise the 2-NEC system 20. The error signal is coupled to an accumulator (AC) 22. The accumulator 22 counts the number of symbol errors providing a symbol error count (SEC). The accumulator utilizes a summer 24 and a delay element 26, wherein the output of the summer 24 is coupled to the delay element 26, and the output of the delay element 26 and the error signal are coupled to the summer 24. The output of the summer 24 provides the symbol error count. With divisor 28, an estimate of the symbol error rate 32 is obtained by dividing the symbol error count 28 by the number of symbols received. The number of symbols received per time slot is known a priori as defined in the NADC standard.

Figure 4:
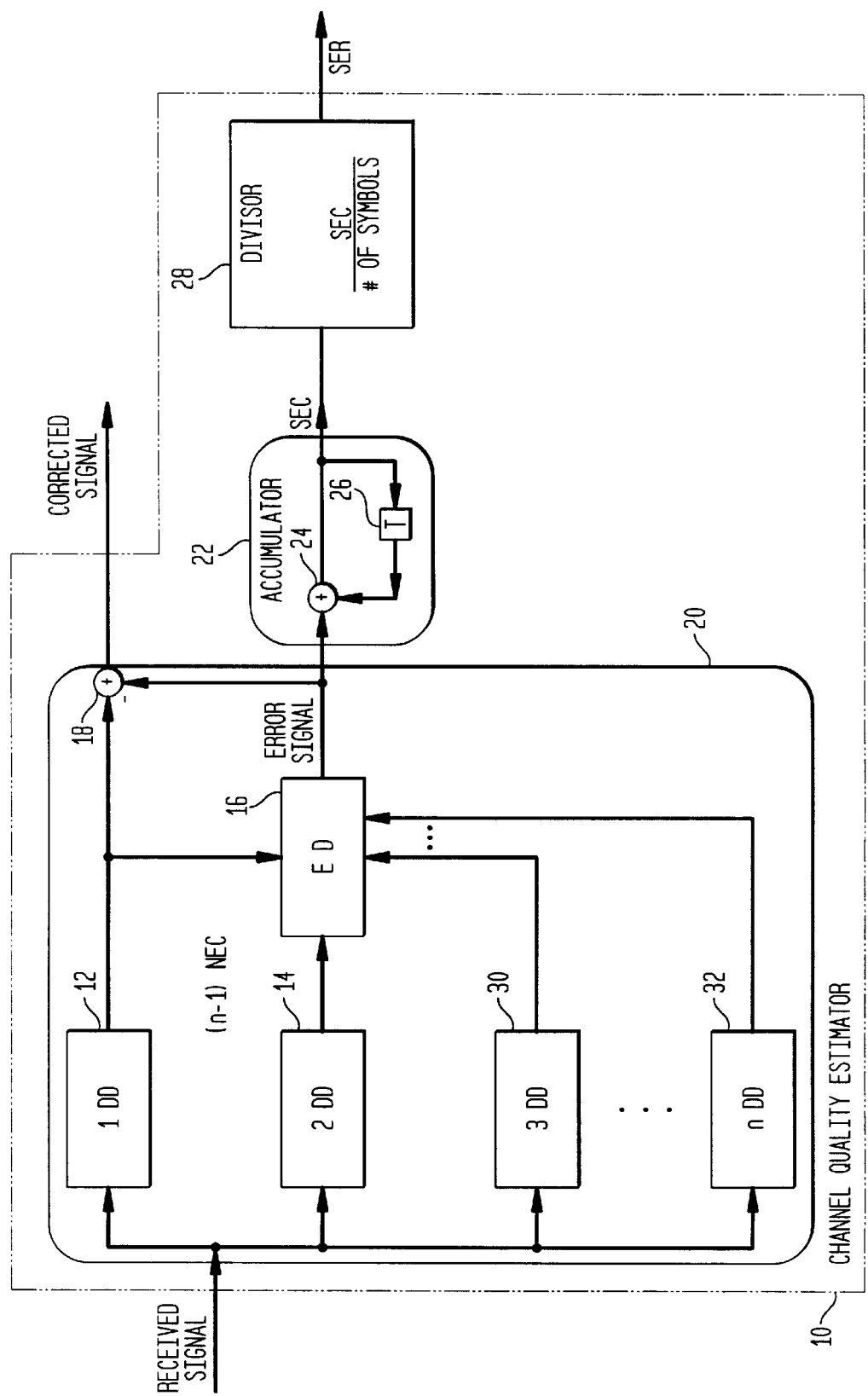
FIG. 4 is a block diagram of an (n−1)-NEC Channel Quality Estimator.

Referring now to FIG. 4, there is shown a block diagram of the channel quality estimator (CQE) generalized utilizing an (n–1)-NEC scheme to estimate the Symbol Error Rate (SER). Elements performing the same functions to those in FIG. 2 and FIG. 3 are assigned the same numbers in FIG. 2 and FIG. 3. A received signal is coupled to a one symbol differential detector 12 (1DD), a two symbol differential detector 14 (2DD), a three symbol differential detector 30 (3DD), on up to an n symbol differential detector 32 (nDD). The detected signal outputs from the one symbol differential detector 12, the two symbol detector 14, the three symbol differential detector 30, on up to the n symbol differential detector 32 are coupled into an error detector 16 (ED). The error detector 16 detects the presence of an error based on the syndromes developed from the inputs and outputs an error signal. Summer 18 subtracts the error signal from the output of the one symbol differential detector 12 producing a corrected signal. The one symbol differential detector 12, the two symbol differential detector 14, the three symbol differential detector 30, on up to the n symbol differential detector 32, the error detector 16 and the summer 18 comprise the (n–1)-NEC system 20. The error signal is coupled to an accumulator (AC) 22. The accumulator 22 counts the number of symbol errors providing a symbol error count (SEC). The accumulator utilizes a summer 24 and a delay element 26, wherein the output of the summer 24 is coupled to the delay element 26, and the output of the delay element 26 and the error signal are coupled to the summer 24. The output of the summer 24 provides the symbol error count. With divisor 28, an estimate of the symbol error rate 32 is obtained by dividing the symbol error count 28 by the number of symbols received. The number of symbols received per time slot is known a priori as defined in the NADC standard.

Figure 5:
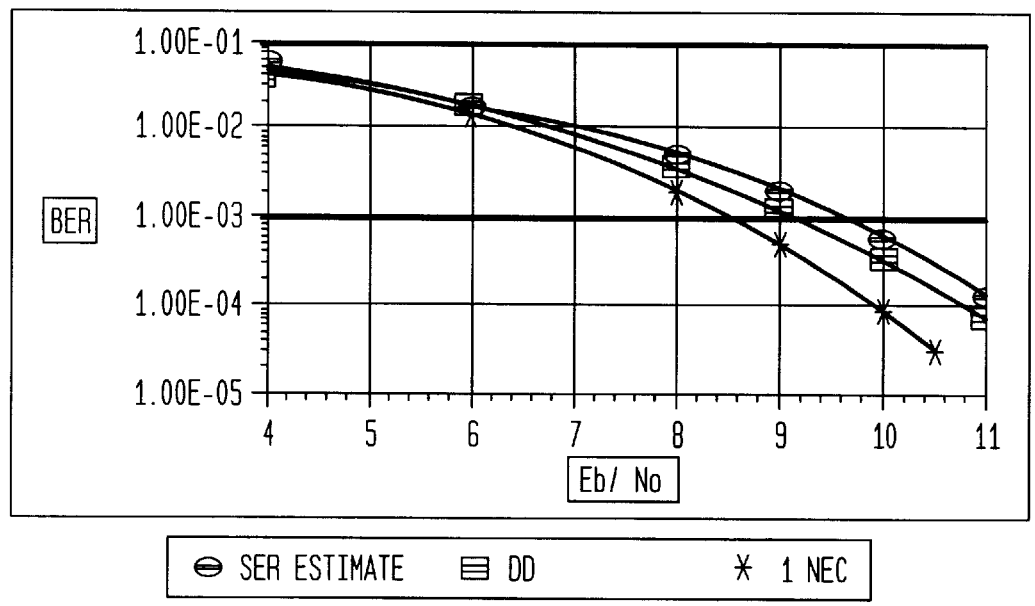
FIG. 5 is a graph of the estimation of symbol error rate using 1-NEC in an AWGN channel.

Referring to FIG. 5, there is shown a graph of the test results of the present invention on the NADC system in the presence of additive white Gaussian noise (AWGN) and flat fading. The SER is plotted as a function of Eb/No (bit-energy/noise density) in the AWGN channel obtained using 1-NEC CQE. The bit error rate (BER) of a conventional differential detector and the 1-NEC differential detector are also plotted. It can be seen that the SER estimate follows very closely the BER obtained using the differential detector. The SER and BER are proportional to each other.

Figure 6:
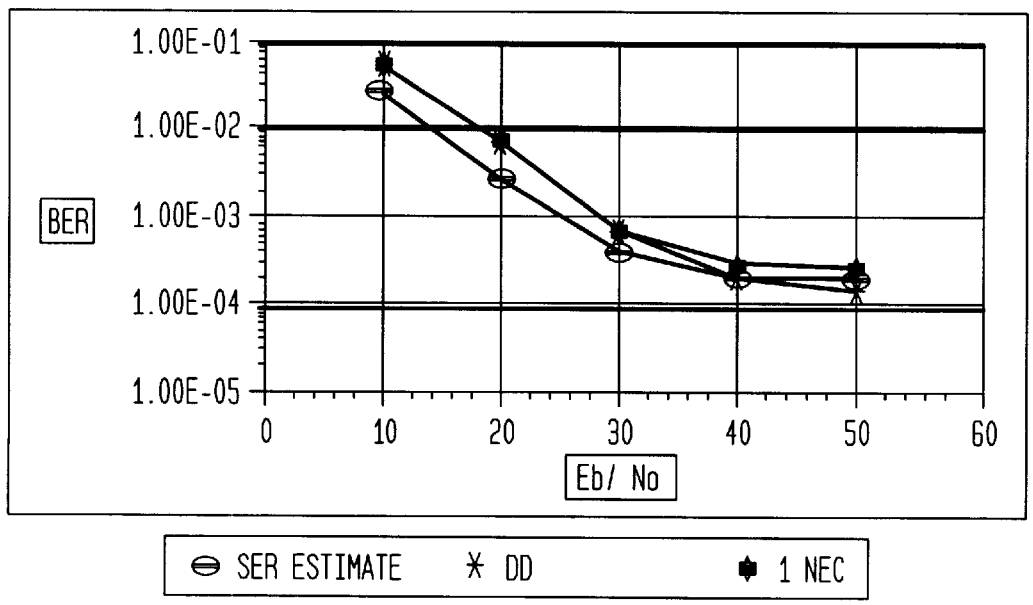
FIG. 6 is a graph of the estimation of symbol error rate using 1-NEC in a flat fading channel.

Referring to FIG. 6, there is shown a graph of the test results of the present invention of the SER obtained using 1-NEC CQE in a flat fading (doppler 80 Hz) channel condition which is typical of a cellular environment. The SER estimate follows the same trend as the BER of the conventional differential detector.

Figure 7:
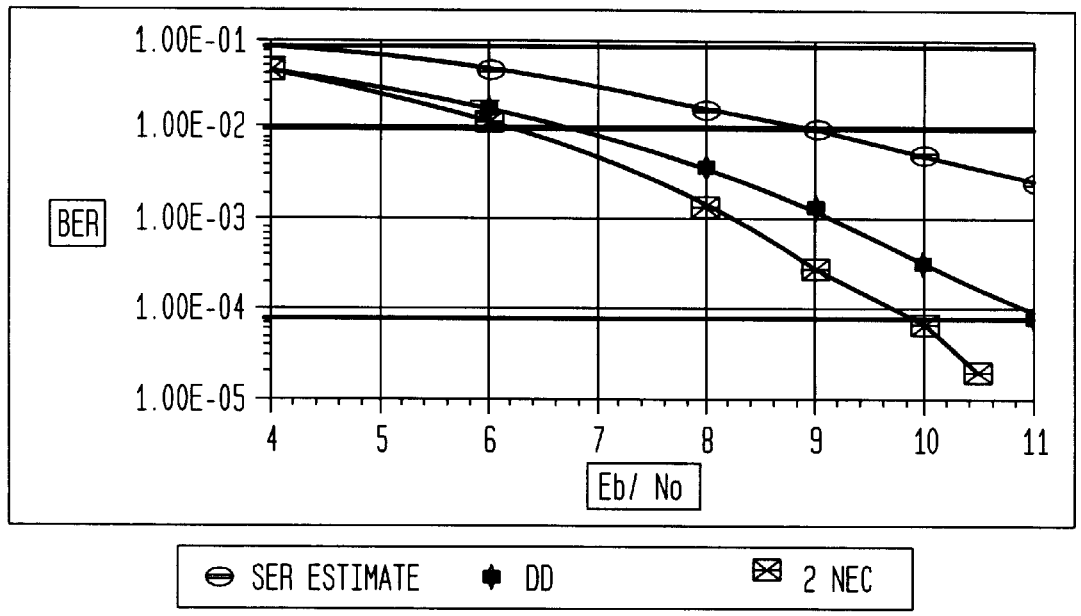
FIG. 7 is a graph of the estimation of symbol error rate using 2-NEC in an AWGN channel.
Figure 8:
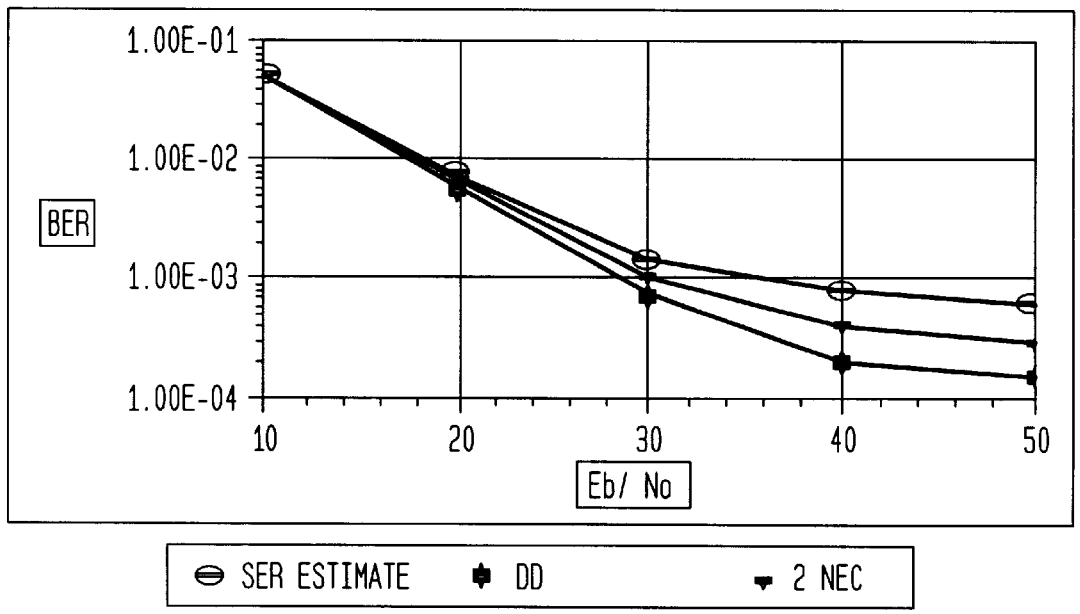
FIG. 8 is a graph of the estimation of symbol error rate using 2-NEC in a flat fading channel.

Referring to FIG. 7, there is shown a graph of the SER estimate using 2-NEC CQE as a function of Eb/No in an AWGN channel. Referring to FIG. 8, there is shown a graph of the estimate of the SER in a flat fading (doppler 80 Hz) environment. The trend of the SER estimate obtained from the 1-NEC CQE follows closely the BER trend of a conventional differential detector in an AWGN channel, while the trend of the SER estimate obtained from 2-NEC CQE follows closely the BER of a conventional differential detector in a flat fading environment.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claim is reserved.

What is claimed:

1. In a communication network, a method for channel quality estimation without the need for an uncorrupted reference signal, the method comprising the steps of:

processing a received signal utilizing a non-redundant error correction scheme to observe at least one symbol;

producing an error signal in response to said observation; and counting a quantity of said error signal during a predetermined time interval to provide a symbol error count; wherein said symbol error count is a measure of channel quality determined independent of an uncorrupted reference signal.

2. The method as recited in claim 1 further comprising the step of dividing said symbol error count by a number of signals received during said predetermined time interval to provide a symbol error rate, wherein said number of signals received is known a priori.

3. The method as recited in claim 1 wherein the step of processing a received signal further comprises utilizing a non-redundant error correction scheme to observe at least two symbols.

4. The method as recited in claim 1 wherein said received signal is a digital cellular signal.

5. The method as recited in claim 4 wherein said digital cellular signal utilizes Π/4-DQPSK modulation.

6. The method as recited in claim 1 wherein said received signal is a TDMA signal.

7. The method as recited in claim 1 wherein said received signal is a PCN signal.

8. The method as recited in claim 1 wherein said non-redundant error correction scheme utilizes a differential detector to observe said at least one symbol.

9. In a communication network, a device for determining channel quality estimation without the need for an uncorrupted reference signal, the device comprising:

a processing circuit for processing a received signal wherein non-redundant error correction is utilized to observe at least one symbol and produce an error signal in response to said observation; and an accumulator coupled to said error signal for counting a quantity of said error signal during a predetermined time interval to provide a symbol error count; wherein said symbol error count is a measure of channel quality determined independent of an uncorrupted reference signal.

10. The device as recited in claim 9 further comprising a scaling circuit for dividing said symbol error count by a number of signals received during said predetermined time interval to provide a symbol error rate, wherein said number of signals received is known a priori.

11. The device as recited in claim 9 wherein said processing circuit observes at least two symbols.

12. The device as recited in claim 9 wherein said processing circuit further comprises:

a one symbol differential detector adapted to receive said received signal and producing a one symbol output;

a two symbol differential detector adapted to receive said received signal and producing a two symbol output; and an error detector coupled to said one symbol output and said two symbol output, wherein said error detector detects an error and produces an error signal.

13. The device as recited in claim 12 wherein said processing circuit further comprises a three symbol differential detector adapted to receive said received signal and producing a three symbol output, said three symbol output coupled to said error detector.

14. The device as recited in claim 9 wherein said received signal is a digital cellular signal.

15. The method as recited in claim 14 wherein said digital cellular signal utilizes Π/4-DQPSK modulation.

16. The device as recited in claim 9 wherein said received signal is a TDMA signal.

17. The device as recited in claim 9 wherein said received signal is a PCN signal.

* * * * *